3,746,720
1-(5')-PHTHALIDYL-3-PHENYLPYRAZOLINES
Peter Stuart Littlewood, Ilkley, England, assignor to Sandoz Ltd., Basel, Switzerland
No Drawing. Filed Nov. 13, 1970, Ser. No. 89,493
Claims priority, application Switzerland, Nov. 21, 1969, 17,350/69; July 3, 1970, 10,093/70
Int. Cl. C07d 49/10
U.S. Cl. 260—310 D          7 Claims

ABSTRACT OF THE DISCLOSURE

Pyrazoline compounds of formula

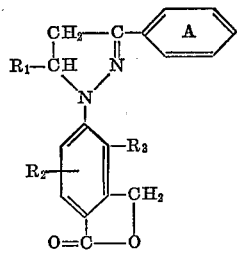

wherein
$R_1$ is hydrogen, alkyl or aryl,
$R_2$ is hydrogen, halogen or alkyl,
$R_3$ is hydrogen, halogen or alkyl, and the nucleus A may bear substituents such as halogen, alkyl, alkoxy, acylamino or substituted triazinylamino and alkyl, aryl, alkoxy and acylamino may be substituted which are useful as optical brighteners.

---

This invention relates to new pyrazoline compounds of formula

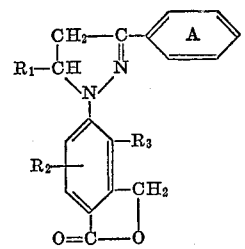

where
$R_1$ stands for a hydrogen atom or an alkyl or aryl radical which may be substituted,
$R_2$ for a hydrogen or halogen atom or an alkyl radical which may be substituted,
$R_3$ for a hydrogen or halogen atom or an alkyl radical which may be substituted, and where the nucleus A may bear substituents selected from the series of halogen atoms, substituted or unsubstituted alkyl, alkoxy or —NH-acyl radicals or radicals of formula

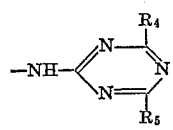

in which both $R_4$ and $R_5$, independently of each other, stand for an amino group which may be monosubstituted or disubstituted, an alkoxy or phenoxy radical which may be substituted, or the phenyl group.

The process for the production of the pyrazoline compounds of Formula I comprises reacting 1 mole of a hydrazino compound of formula

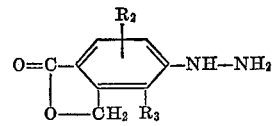

with 1 mole of a compound of formula

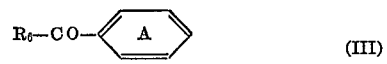

where $R_6$ stands for —CH=CH—$R_1$, —CH$_2$—CH$_2$—Hal or

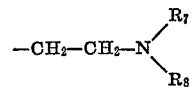

and $R_7$ and $R_8$ each stands for a hydrogen atom, a lower alkyl radical or, jointly with the nitrogen atom, for a hetero ring.

Chlorine, bromine and fluorine atoms are examples of suitable halogen atoms. The substituted or unsubstituted alkyl radicals may be alkyl radicals having 1 to 18 carbon atoms, preferably 1 to 12 or optimally 1 to 5 carbon atoms, and the suitable substituents include hydroxyl, alkoxy and cyano groups, halogen atoms and phenyl groups which may be substituted. The following may be named as examples: methyl, ethyl, n-propyl, iso-propyl, n-butyl, iso-butyl, tert.butyl, n-amyl, iso-amyl, sec.amyl, tert.amyl, n-octyl, 2-ethylhexyl, n-decyl, n-dodecyl, n-tetradecyl, cetyl, stearyl, oleyl; of these, the lower molecular-weight ones with about 5 carbon atoms are preferred. Further examples are 2-hydroxyethyl, 2- and 3-hydroxypropyl, 2-methoxyethyl, 2-ethoxyethyl, 2-butoxyethyl, 3-methoxypropyl, 2-cyanethyl, 2-chlorethyl, trifluormethyl, 2,2-difluorethyl, benzyl and phenylethyl.

The alkoxy groups are preferably lower, such as methoxy, ethoxy, n-butoxy.

Examples of suitable aryl radicals are naphthyl, diphenylyl, and more especially phenyl radicals, which may themselves bear substituents such as lower alkyl, or alkoxy groups, hydroxyl groups, cyano groups or halogen atoms. They are exemplified by the following: naphthyl-1, naphthyl-2, 4-diphenylyl, phenyl, 2-, 3- and 4-methyl-, 4-ethyl-, 4-isopropyl-, 4-tert.butyl-, 4-n-butyl-, 4-tert.amyl-phenyl, 2- and 4-methoxyphenyl, 2- and 4-ethoxyphenyl, 2-, 3-, and 4-chlorophenyl, 4-bromo- and 4-fluorophenyl, 2,4-, 2,5-, 2,6- and 3,5-dimethylphenyl, 4-cyanophenyl and 4-hydroxyphenyl.

The acyl radicals are derived from carboxylic acids such as those of the aliphatic, aromatic, cycloaliphatic and heterocyclic series; examples are formic, acetic, propionic, butyric, valeric, caproic, octoic, 2-ethylhexoic, decanoic, lauric, myristic, palmitic and stearic acids among the saturated aliphatic carboxylic acids; acrylic, crotonic, oleic acids among the unsaturated aliphatic carboxylic acids; phenylacetic, phenoxyacetic, phenoxypropionic acids among the substituted aliphatic carboxylic acids; cyclohexylcarboxylic acid as a cycloaliphatic carboxylic acid; further benzoic acid and its alkyl derivatives such as 4-methyl-, 4-ethyl- and 4-iso-propyl-benzoic acid; halogen derivatives such as 2- and 4-chlorobenzoic acid, 4-bromobenzoic acid, 1- and 2-naphthoic acid, diphenyl-4-carboxylic acid among the aromatic carboxylic acids; nicotinic, iso-nicotinic and picolinic acids among the heterocyclic carboxylic acids.

Other suitable acryl radicals are derivatives of sulphonic acids, e.g. of aliphatic sulphonic acids such as alkanesulphonic acids (methane-, ethane-, propane-1-, propane-2-, n-butane-1-, n-hexane-1-, n-octane-1-sulphonic acids) and alkenesulphonic acids (vinylsulphonic acid); of aromatic sulphonic acids (benzene-, 2- and 4-methylbenzene-, 4-chlorobenzene-, 2- and 4-methoxybenzene-, 2- and 4-ethoxybenzene, 2,4- and 2,5-dimethylbenzene-, 4-tert.butylbenzene-, naphthalene-1-, naphthalene-2-, diphenyl-4- and diphenyloxide-4-sulphonic acids); of heterocyclic sulphonic acids (pyridine-3-sulphonic acid); and of aminosulphonic acids (dimethylamino-, diethylamino-, morpholino- and piperidino-sulphonic acids).

Further acyl radicals are derivatives of esters of chlorocarbonic acids, e.g. of the aliphatic, cycloaliphatic and aromatic series, such as the methyl, ethyl, n-propyl, n-butyl, iso-amyl, n-amyl, n-hexyl, 2-ethylhexyl, n-octyl, n-decyl, n-dodecyl, benzyl, phenylethyl, cyclohexyl, 4-methylcyclohexyl, phenyl, 2-, 3- and 4-methylphenyl, 2,4-dimethylphenyl, 2,5-dimethylphenyl, 4-n-butylphenyl, 4-tert.butylphenyl, 4-tert.amylphenyl, tert.octylphenyl, 4-chlorophenyl, 4-bromophenyl, 4-methoxyphenyl, 4-ethoxyphenyl, naphthyl-1, naphthyl-2, diphenylyl-4 and quinolyl-8 ester.

When $R_4$ and $R_5$ denote monosubstituted or disubstituted amino groups they may stand for radicals of primary or secondary aliphatic amines such as methyl-, ethyl-, n-butyl-, n-octyl-, 2-ethylhexyl-, n-dodecyl-, cetyl-, stearyl-, oleyl-, dimethyl-, diethyl-, di-n-butyl-, 2-hydroxyethyl-, 2- and 3-hydroxypropyl-, bis-(2-hydroxyethyl)-, bis-(2-hydroxypropyl)-, 2-methoxyethyl-, 2-ethoxyethyl-, 3-methoxypropyl-, 4-methoxybutyl-, benzyl- and phenylethylamines; radicals of cycloaliphatic amines such as cyclohexyl-, cyclooctyl-, 4-methylcyclohexyl-, dicyclohexylamines; radicals of aromatic amines such as aminobenzene, 1-amino-2-, -3- and -4-methyl-, -methoxy-, -ethoxy- and -chlorobenzene, 1-amino-4-ethyl-, -4-n-propyl-, -4-iso-propyl-, -4-n-butyl-, -4-tert.butyl-, -4-tert. amyl-, -4-tert.octyl-, -4-n-dodecylbenzene, 1-amino-4-bromo-, -4-fluoro-, -4-cyanobenzene, 1-amino-2,4,-, -2,5-, -2,6- and -3,5-dimethylbenzene, 1-amino-2,4,6-trimethylbenzene, 1-amino- and 2-aminonaphthalene, 4-aminodiphenyl, 4-amino-diphenylamine, 4-aminodiphenyloxide, N-methyl-, N-ethyl-, N - 2' - hydroxyethylaminobenzene; radicals of heterocyclic amines such as 2-, 3- and 4-aminopyridine, piperidine, pyrrolidine, hexamethyleneimine and morpholine.

The following may be named as examples of alkoxy and phenoxy radicals which may be substituted: methoxy, ethoxy, n- and iso-propoxy-, n- and iso-butoxy, n-amyloxy, n-octyloxy, 2-ethylhexyloxy, n-decyloxy, n-dodecyloxy, cetyloxy, stearyloxy, oleyloxy, 2-methoxyethoxy, 2-ethoxyethoxy, 2 - n - butoxyethoxy, 3-methoxypropoxy, 4-methoxybutoxy, 2-(2'-methoxyethoxy)-ethoxy, 2-(2'-ethoxyethoxy)-ethoxy, 2-(2'-butoxyethoxy)-ethoxy, phenoxy, 2-, 3- and 4-methylphenoxy, 2-, 3- and 4-chlorophenoxy, 4-bromophenoxy, 3- and 4-methoxy- and 4-ethoxyphenoxy, 2,4-, 2,5- and 3,5-dimethylphenoxy, 4-chloro-3-methylphenoxy, 2-iso-propyl-5-methylphenoxy.

$R_7$ and $R_8$, jointly with the nitrogen atom, may form a hetero ring such as morpholine, piperidine, pyrrolidine or hexamethyleneimine.

The reaction of the hydrazino compound of Formula II with the compound of Formula III is carried out preferably in an inert solvent, i.e. in a lower alcohol (methanol, ethanol, iso-propanol, n-propanol); an ether (dioxan, 1,2 - dimethoxyethane, 1,2 - diethoxyethane); an ether-alcohol (2-methoxyethanol, 2-ethoxyethanol, 2-n-butoxyethanol, 2-(2'-methoxyethoxy)-ethanol, 2-(2'-ethoxyethoxy)-ethanol, 2-(2' - n - butoxyethoxy)-ethanol); a glycol (ethylene glycol, propylene glycol, glycerol); in a lower organic carboxylic acid (acetic or propionic acid); in amines such as dimethylformamide, diethylformamide, dimethylacetamide, phosphoric acid tris-(dimethylamide); in tertiary amines such as pyridine, picoline, quinoline; in sulphoxides or sulphones such as dimethyl sulphoxide, diethyl sulphoxide, tetramethylene sulphone; in water or in a mixture of water and an organic solvent, e.g. as mentioned above. An elevated temperature is chosen for the reaction, e.g. 50° C. to 150° C. or preferably 90° C. to 100° C., with atomspheric pressure or excess pressure; the pH may range from 1 to 11 but it is preferably alkaline in the region of pH 8 to 11 or acid, pH 1 to 5; for adjustment to the required pH value alkaline compounds can be added as catalysts, such as sodium acetate, carbonate, bicarbonate, hydroxide or methylate, or acids such as acetic, propionic, sulphuric or hydrochloric acid. The reaction takes from 1 to 20 hours to complete, depending upon the reactants and the reaction conditions (solvent, temperature, catalyst.)

On completion of the reaction the mixture, if it is alkaline, is acidified and then held for a short time at a higher temperature to allow for closure of the lactone ring. When it has cooled the precipitated product is filtered off, washed with water, dried, and if desired recrystallized from solution in a lower alcohol, an ether alcohol, a lower carboxylic acid or dimethyl formamide.

The new pyrazolines of Formula I are solid crystalline substances of yellow colour, very sparingly soluble in water, soluble to a certain degree in washing liquors, and fully soluble in organic solvents. They are valuable optical brighteners for textiles, notably textiles of natural and synthetic polyamide fibres (wool, silk, hair, polyamide 6, 66, 610, 11), polyacrylonitrile fibres, and cellulosic fibres (cotton, viscose rayon) finished with synthetic resins. They are applicable from aqueous neutral or acid dispersion to polyacrylonitrile fibres and cellulose esters, e.g. cellulose acetates such as cellulose diacetate and triacetate, cellulose acetatopropionates and acetatobutyrates, and also in dry cleaning liquors. They can be incorporated in films and flat moulded goods, e.g. of polyvinyl chloride, by processing on a roller mill.

The pyrazolines of Formula I are employed as optical brighteners in amounts varying from 0.001% to 0.5%, or optimally 0.01% to 0.2%. Brilliant reddish effects are obtained which show good fastness to light, washing and other wet treatments.

In relation to the nearest comparable pyrazoline brighteners disclosed in British Pat. 832,239, which bear in 1-position e.g. a para-ethoxycarbonylphenyl radical, the pyrazoline brighteners described herein are distinctive in that they cause no yellowing of the fibre after application from successive laundering or washing liquors. A further advantage is that they can be produced easily from inexpensive starting compounds.

Especially interesting pyrazoline compounds of Formula I are those of formula

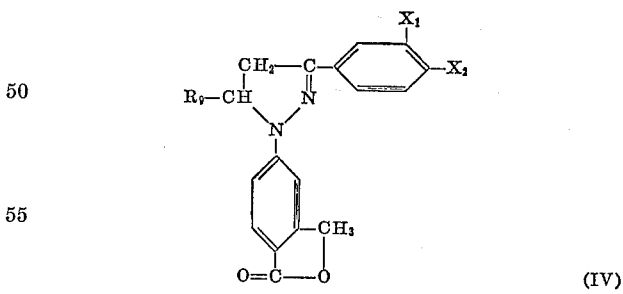

(IV)

where $X_1$ stands for a hydrogen or halogen atom, e.g. a chlorine atom, $X_2$ for a hydrogen or halogen atom, e.g. a chlorine atom, a lower alkyl or alkoxy radical (methyl, ethyl, iso-propyl, n-butyl, tert.butyl, tert.amyl, methoxy, ethoxy), a lower alganoylamino group (acetylamino, propionylamino, butyrylamino), a cyano group or a phenyl radical, and $R_9$ for a hydrogen atom or a phenyl radical.

In the following examples the parts and percentages are by weight and the temperatures in degrees centigrade.

EXAMPLE 1

A mixture of 5.8 parts of 4-chloro-1-(β-morpholinopropionyl)-benzene hydrochloride, 4.0 parts of 5-hydrazinophthalide hydrochloride, 8.5 parts of anhydrous sodium carbonate and 60 parts of water is raised to the boil with stirring and reacted for 18 hours with stirring and under reflux. The mixture is allowed to cool, adjusted to pH 2 with concentrated hydrochloric acid, raised to the boil again and boiled for 5 minutes with reflux. After cooling, the precipitated product is filtered with suction, washed, dried and recrystallized from dimethylformamide. The pyrazoline of formula

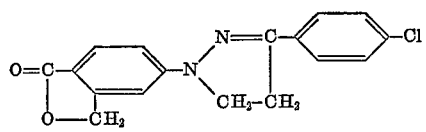

(V)

is obtained in the form of pale yellow needles with melting point 242–243° (uncorrected). The yield is 4.6 parts which is 74% of theory.

The 4-chloro-1-(β-morpholinopropionyl)-benzene hydrochloride used in this example can be prepared as follows: 100 parts of 4-chloro-1-acetylbenzene, 85 parts of morpholine hydrochloride and 30 parts of paraformaldehyde are entered into 232 parts of 2-ethoxyethanol, the mixture is raised to the boiling temperature (about 135°) and reacted for 5 minutes at this temperature with reflux. On cooling the 4-chloro-1-(β-morpholinopropionyl)-benzene hydrochloride crystallizes out of the mixture and is filtered off with suction and dried. Its melting point is 206–208° (uncorrected) and the yield is 132 parts which is 70% of theory.

The 5-hydrazinophthalide hydrochloride can be produced as follows: 19.9 parts of 5-aminophthalide [prepared by the method of Tirouflet in Bull. Soc. Sci. Bretagne Spec. No. 26, page 7 (1951) as reported in Chemical Abstracts, 47, 8692–8693] are entered into a mixture of 24 parts of water and 28.5 parts of concentrated hydrochloric acid. The solution is cooled to 0°, 50 parts of ice are added, then a solution of 6.9 parts of sodium nitrite in 25 parts of water is run in slowly so that the temperature remains below 5°. The diazo solution is filtered and poured in one charge into a solution of 53 parts of sodium sulphite heptahydrate and 8 parts of anhydrous sodium carbonate in 40 parts of water. The mixture is raised to 70° and stirred at this temperature for 1 hour 30 minutes. Subsequently 83 parts of concentrated hydrochloric acid are added and the solution is allowed to cool, on which the solid product settles out. It is filtered off and dried. The yield of 5-hydrazinophthalide hydrochloride (melting point 256–261°, uncorrected) is 17.4 parts, which is equal to 87% of theory.

The 5-aminophthalide is prepared as follows:

To 60 g. phthalide in 75 cc. 65–6° Bé. $H_2SO_4$ is added 56 g. $KNO_3$ in 120 cc. $H_2SO_4$ dropwise at 10°. The resulting mixture is allowed to stand 18 hours at room temperature. Addition of 2 l. $H_2O$ and recrystallization from HOAc gives 6-nitrophthalide. Evaporation of the HOAc filtrate and 3 recrystallizations from aqueous dioxane yields 4-nitrophthalide. Reaction of 0.36 g. 4-nitrophthalide with 2 g. $SnCl_2$ in 6 cc. cold concentrated HCl gives 4-aminophthalide. Addition of 75 parts 4-aminophthalide to a stirred mixture of 144 parts Zn powder, 0.2 part $CuSO_4$, 45 parts NaOH and 175 parts $H_2O$ at 0°, then 200 parts $H_2O$, heating 10 hours at 70–80°, filtering acidifying with HCl, boiling and precipitating by $Na_2CO_3$ yields 5-aminophthalide.

EXAMPLE 2

The procedure described in Example 1 is followed using similar β-morpholinopropionylbenzene hydrochlorides. The products are 1-(5')-phthalidyl-3-phenyl-Δ²-pyrazolines of Formula IV, in which $R_9$ stands for hydrogen and $X_1$ and $X_2$ have the following meanings:

TABLE

| Ex. No. | $X_1$ | $X_2$ | Melting point (uncorrected), degrees |
|---|---|---|---|
| 2 | H | H | 216–7 |
| 3 | H | $CH_3$ | 203–4 |
| 4 | H | $CH_3O$ | 214–5 |
| 5 | H | $CH_3$—CO—NH— | 315–6 |
| 6 | H | CN | 290–1 |
| 7 | Cl | Cl | 245–6 |
| 8 | H |  | 297 9 |

EXAMPLE 9

A mixture of 3.2 parts of 4-chloro-1-acetylbenzene, 3.6 parts of 30% formaldehyde solution and 1.3 parts of ammonium chloride is raised to 100° with stirring and reacted for 1 hour at this temperature with stirring and reflux. After the mixture has cooled, the lower layer is separated and added to a suspension of 4 parts of 5-hydrazinophthalide hydrochloride and 8.5 parts of anhydrous sodium carbonate in 60 parts of water. The mixture is stirred and reacted for 16 hours at the boil with heating and reflux. Its pH is then carefully adjusted to 1 with concentrated hydrochloric acid, it is held for a further 5 minutes at the boil and then allowed to cool. The product settles out and is filtered off and recrystallized from dimethyl formamide. The yield of the pyrazoline of Formula V is 2.7 parts (43% of theory); its melting point is 240–241° (uncorrected).

EXAMPLE 10

A mixture of .24 parts of acetylbenzene (acetophenone), 3.6 parts of 30% formaldehyde solution and 1.3 parts of ammonium chloride is reacted for 1 hour at the boil with stirring and reflux. On cooling the lower layer is separated and added to a mixture of 4 parts of 5-hydrazinophthalide hydrochloride, 8.5 parts of anhydrous sodium carbonate and 60 parts of water. The mixture is reacted for 16 hours at the boil with stirring and reflux. After this time it is carefully acidified to pH 1 with concentrated hydrochloric acid, held a boiling temperature for 5 minutes and cooled. The precipitate is filtered off with suction and recrystallized from dimethyl formamide. The product, 1-(5')-phthalidyl-3-phenylpyrazoline, is obtained in a yield of 2.5 parts (52% of theory); its melting point (uncorrected) is at 217–218°.

EXAMPLE 11

10 parts of 5-hydrazinophthalide hydrochloride are carefully entered into a solution of 16 parts of anhydrous sodium carbonate in 120 parts of water, followed by 10.2 parts of 4-chloro-1-(β-chloropropionyl)-benzene. With constant stirring, the mixture is raised to boiling temperature and held at this temperature for 16 hours with reflux. After careful adjustment of the pH to 1 with concentrated hydrochloric acid, the mixture is held for a further 5 minutes at boiling temperature and then cooled. The precipitated product is filtered off and recrystallized from dimethyl formamide. 8.5 parts of 1-(5')-phthalidyl-3-(4''-chlorophenyl)-pyrazoline (52% of theory) are obtained; the melting point (uncorrected) of this compound is 237–240°.

EXAMPLE 12

16 parts of anhydrous sodium carbonate are stirred into 60 parts of water and 46 parts of iso-propyl alcohol. The mixture is raised to the boil, on which 10 parts of 5-hydrazinophthalide hydrochloride are added in portions, followed by 12.1 parts of 4-chlorophenyl styryl ketone (4-chlorochalcone). With continued stirring, the mixture is reacted for 16 hours at the boil with reflux.

It is then run into 500 parts of water, the pH adjusted to 1 with concentrated hydrochloric acid and the temperature again increased to the boil. After the mixture has cooled the precipitate is filtered off and crystallized from glacial acetic acid. The product, 1-(5')-phthalidyl-3-(4''-chlorophenyl)-5-phenylpyrazoline, is obtained in a yield of 3.4 parts, which is 17.5% of theory; its melting point (uncorrected) is at 220–222°.

EXAMPLE 13

10.05 parts of 5-hydrazinophthalide hydrochloride and 11.17 parts of p-chlorophenyl-β-chlorethyl ketone are entered at room temperature into a thoroughly stirred solution of 16 parts of anhydrous sodium acetate in 125 parts of water. The mixture is raised to the boil and vigorously stirred for 1 hour with reflux condensing. It is filtered while still hot and the filter residue washed with hot water. The solid product is treated for 1 hour with 40 parts of cold acetone and the precipitate filtered off, washed twice with 20 parts of acetone each time, and dried. The 1-(5'-phthalidyl)-3-(4''-chlorophenyl)-pyrazoline is obtained as a pale yellow powder with melting point 235–239°. The yield is 9.68 parts which is 62% of theory.

EXAMPLE 14

Optical brighteners suitable for polyamide fibres and plastic materials are also obtained, when the 11.17 parts of para-chlorophenyl-β-chlorethylketone employed in Example 13 are replaced by 11.6 parts of para-isopropylphenyl-β-chlorethylketone or 12.4 parts of para-tert.butylphenyl-β-chlorethylketone or 13.1 parts of para-tert.amylphenyl-β-chlorethylketone or 13.2 parts of para-n-butoxyphenyl-β-chlorethylketone.

APPLICATION EXAMPLE A

A white test fabric of nylon 6.6 fibre is treated for 30 minutes at 30° and 60° at a liquor to goods ratio of 50:1 in an aqueous bath containing 0.4% of a powder detergent based on a fatty alkyl sulphate and 4 parts per million (0.1% of the detergent) of the pyrazoline of Example 1. Prior to addition the pyrazoline is dissolved in 2-ethoxyethanol and the solution run into water to form a fine dispersion.

After the treatment, the test fabric is rinsed for 30 seconds with cold water and dried. It is appreciably brighter than an untreated control sample of the same fabric.

APPLICATION EXAMPLE B

Five parts of a white "Banlon" (registered trademark) fabric of nylon 6.6 fibre are treated in 250 parts of an aqueous bath containing 1 part of a powder detergent based on sodium dodecylbenzenesulphonate and 0.004 part of the pyrazoline of Example 5. Before use, the brightener is finely dispersed by pouring a 0.08% solution in 2-ethoxyethanol into water. The nylon 6.6 fabric is entered into the brightening liquor at 40°, the temperature raised to 70° in 15 minutes and the fabric treated at this temperature for 30 minutes. On removal it is well rinsed in cold demineralized water and dried at 60°. In comparison with the untreated fabric, the treated piece shows a brilliant white effect.

APPLICATION EXAMPLE C

A nylon 6.6 test fabric is brightened by the method described in Application Example A using, in place of the pyrazoline of Example 1, 4 parts per million of the pyrazoline of Example 7. The treatment imparts a notably high degree of whiteness to the fabric compared with the untreated material.

APPLICATION EXAMPLE D

Five parts of a white "Banlon" (registered trademark) fabric of nylon 6.6 fibre are treated in an aqueous bath containing 0.01 part of the pyrazoline of Example 3, 1.5 parts of a 10% aqueous acetic acid solution and 10 parts of a 2.5% solution of a carboxymethylated oleyldecaglycol ether. Prior to application a fine dispersion of the brightener is prepared by stirring a 0.1% solution in 2-ethoxyethanol into an excess of water. The nylon fabric is entered into the brightening liquor at 40°, the temperature is increased to 90–95° in about 30 minutes and the fabric treated for 30 minutes at this temperature. A thorough rinse in demineralized water completes the treatment. The fabric has a brilliant white appearance.

APPLICATION EXAMPLE E

Five parts of a fabric of polyacrylonitrile fibres ["Orlon" 42 (registered trademark)] are entered into an aqueous solution of 200 parts at 40° set with 0.01 part of the pyrazoline of Example 2 in 0.1% solution in 2-ethoxyethanol, 1.5 parts of a 10% acetic acid solution and 10 parts of a 2.5% solution of a carboxymethylated oleyldecaglycol ether. The bath is raised to 90–95° in about 30 minutes and held at this temperature for 60 minutes. On removal the fabric is rinsed well in hot and then in cold demineralized water and dried at 60°. It shows a good white in comparison with identical but untreated fabric.

APPLICATION EXAMPLE F

Five parts of a scoured, peroxide bleached wool fabric are treated for 30 minutes at 40° in 200 parts of a bath containing 0.025 part of the pyrazoline of Example 2 in 0.1% solution in 2-ethoxyethanol, 1.5 parts of a 10% aqueous acetic acid solution and 10 parts of a 2.5% solution of a carboxymethylated oleyldecaglycol ether. On removal it is well rinsed with demineralized water and dried at 60°. Notably good whiteness is shown by the treated fabric compared with the same fabric without treatment.

APPLICATION EXAMPLE G

A bath of 100 parts of moulding material is prepared with 65 parts of polyvinyl chloride and 35 parts of a plasticizer, e.g. dioctyl phthalate, to which are added 1.3 parts of a stabilizer, 0.03 part of the pyrazoline of Example 2 and 2.5% titanium dioxide of opaque film is to be produced.

The moulding mixture is processed on a roller mill for 3–6 minutes at 165–185° and drawn off as film. The film is superior in appearance to film of the same composition without the brightener additive. Similarly good results are obtained with the compound of Example 4.

APPLICATION EXAMPLE H

A mixture is prepared with 10 parts of the pyrazoline of Formula V, 8 parts of sodium dioctylphenylpolyglycol ether oxyacetate containing 40 ethenoxy groups in the molecule, 2 parts of a castor oil sulphonated to 80% and 80 parts of water. The mixture is comminuted in a suitable machine such as a sand mill until the major proportion of the particles is within the size range of 0.5 to 2 microns.

A bath of 3000 parts of water is set with 2 parts of this brightener dispersion and 2 parts of 85% formic acid, and 100 parts of a fabric of cellulose acetate fibre are treated in it for 30 minutes at 70–80°. On removal the fabric is rinsed with warm and then cold water and dried. It exhibits a higher degree of whiteness than before the treatment.

APPLICATION EXAMPLE I 100 parts of an undyed fabric of "Dicel" (registrated trademark) cellulose acetate fibre are entered into a bath at 40° prepared with 4000 parts of water and 0.5 part of a 40% dispersion of 1-(5'phthalidyl)-3-(4''-chlorophenyl)-$\Delta^2$-pyrazoline in an adduct of ethylene oxide on dibutylphenol.

The temperature is increased to 80° in 15 minutes and this temperature maintained for 30 minutes, after which the fabric is removed, rinsed with cold demineralized water and dried. The brilliant white effect obtained on the fabric contrasts markedly with the appearance of the unbrightened fabric.

The 1-(5'-phthalidyl)-3-(4''-chlorophenyl)-Δ²-pyrazoline can be replaced by the equivalent amount of 1(5'-phthalidyl)-3-phenyl-Δ²-pyrazoline, on which a brilliant reddish white effect is obtained.

APPLICATION EXAMPLE K 100 parts of loose "Tricel" (registered trademark) cellulose triacetate fibre are bleached with sodium chlorite and entered at 40° into a bath of 4000 parts of water containing 0.5 part of a 40% dispersion of 1-(5'-phthalidyl)-3-(4''-chlorophenyl)-Δ²-pyrazoline in an adduct of ethylene oxide on dibutylphenol. The bath temperature is increased to 90–95° in 15 minutes, the fabric treated for 30 minutes at this temperature, rinsed with cold demineralized water and dried at 80°. It is considerably brighter than an untreated sample of the fabric.

APPLICATION EXAMPLE L 100 parts of "Tricel" (registered trademark) lock-knit fabric of cellulose triacetate fibre are bleached with sodium chlorite and conveyed into a dispersion of 0.2 part of 1-(5'-phthalidyl)-3-phenyl-Δ²-pyrazoline in 0.1% solution in 2-ethoxyethanol and 6 parts of a fatty alkyl-di- or -tri-glycol ether sulphate in 4000 parts of water. The temperature is increased to 90–95° in 15 minutes and the fabric treated for 30 minutes at this temperature. On removal it is rinsed well with demineralized water and dried at 80°. It exhibits a high degree of whiteness.

APPLICATION EXAMPLE M 100 parts of "Arnel" (registered trademark) cellulose triacetate staple fibre are treated for 30 minutes at room temperature in a solution of 0.5 part of 1-(5'-phthalidyl)-3-(4''-chlorophenyl)-Δ²-pyrazoline in 6500 parts of tetrachlorethylene. A small amount of dimethyl formamide is included to act as dissolving assistant. The treatment imparts a brilliant white effect to the cellulose triacetate.

APPLICATION EXAMPLE N

A mixture is prepared with 10 parts of 1-(5'-phthalidyl)-3-(4''-chlorophenyl)-Δ²-pyrazaline, 22 parts of a highly sulphonated castor oil, 8 parts of sodium dioctylphenylpolyglycol ether oxyacetate containing 40 ethenoxy groups in the molecule, and 80 parts of water. The mixture is treated in a sand mill or other equipment for comminution until a size distribution range of 0.5 to 2 microns is reached with the majority of the particles.

5 parts of this dispersion are mixed with 20 parts of nonylphenylhexaglycol ether and the mixture is diluted with water to 1000 parts. The aqueous dispersion is padded on a fabric of polyamide 6.6 fibre at an expression giving a 100% increase on the dry weight, dried on a stenter at 100° and treated for 30 seconds at 180° in a Mathys machine for fixation. A high degree of whiteness is obtained on the fabric.

Formulate of representing pyrazoline compounds of the foregoing examples are as follows:

EXAMPLES 2 AND 10

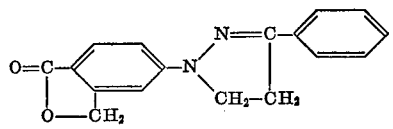

EXAMPLE 3

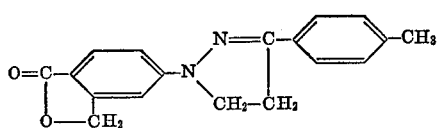

EXAMPLE 5

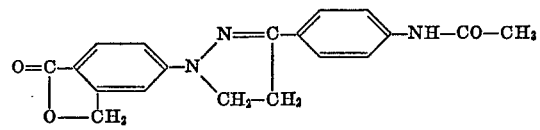

EXAMPLE 7

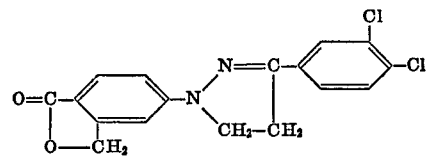

Having thus disclosed the invention what I claim is:

1. A compound of the formula

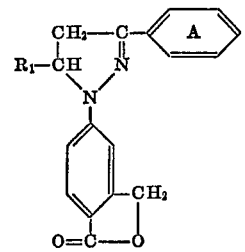

in which
R₁ signifies hydrogen, alkyl of 1 to 12 carbon atoms or phenyl,
and ring A is unsubstituted or mono-substituted by halogen, alkyl of 1 to 12 carbon atoms, alkoxy of 1 to 12 carbon atoms, lower alkanoylamino, cyano or phenyl or di-substituted by halogen.

2. A pyrazoline compound of the formula

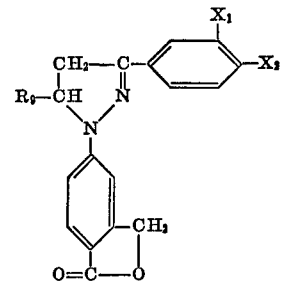

where
X₁ is hydrogen or chlorine,
X₂ is hydrogen, chlorine, lower alkyl, lower alkoxy, lower alkanoylamino, cyano or phenyl,
and R₉ is hydrogen or phenyl.

3. The pyrazoline compound according to claim 2 of the formula

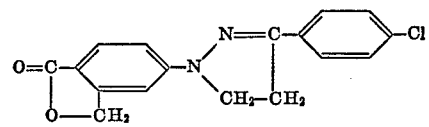

4. The pyrazoline compound according to claim 2 of the formula

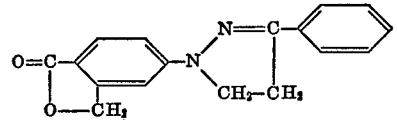

5. The pyrazoline compound according to claim 2 of the formula

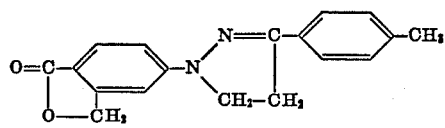

6. The pyrazoline compound according to claim 2 of the formula

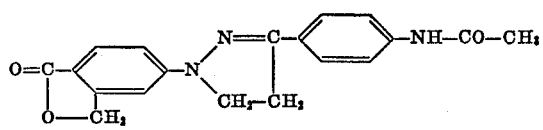

7. The pyrazoline compound according to claim 2 of the formula

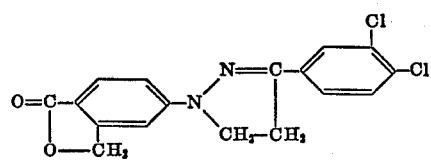

References Cited
FOREIGN PATENTS

| | | | |
|---|---|---|---|
| 832,239 | 4/1960 | Great Britain | 260—310 D |
| 883,826 | 12/1961 | Great Britain | 260—310 D |
| 405,327 | 7/1966 | Switzerland | 260—310 D |
| 434,273 | 10/1967 | Switzerland | 260—310 D |

OTHER REFERENCES

Kranz Chem. Ber. vol. 100, pages 2261–73 (1967).
Tasman Chem. Abst. vol. 21, pages 3357–8 (1927).
Tirouflet Chem. Abst. vol. 47, columns 8692–8693 (1953).

NATALIE TROUSOF, Primary Examiner

U.S. Cl. X.R.

106—38.25; 117—33.5 R; 252—301.3 W; 260—239 B, 247.7 K, 293.8, 249.5, 326.5 J, 346.2 R, 570.5 C, 590